United States Patent [19]
Morishita

[11] 3,983,615
[45] Oct. 5, 1976

[54] SLIDING SEAL MEMBER FOR AN INTERNAL COMBUSTION ENGINE
[75] Inventor: Tsuyoshi Morishita, Hiroshima, Japan
[73] Assignee: Toyo Kogyo Co., Ltd., Japan
[22] Filed: Feb. 5, 1974
[21] Appl. No.: 440,140

[30] Foreign Application Priority Data
Feb. 9, 1973   Japan............................ 48-16232

[52] U.S. Cl................ 29/182.1; 29/182.5; 75/200; 427/431; 427/436
[51] Int. Cl.² ............................................ C22C 1/04
[58] Field of Search ............ 75/200, 213, 201, 211; 29/182.1, 191.2, 192; 117/100 M; 427/431, 436

[56] References Cited
UNITED STATES PATENTS

| 3,307,924 | 3/1967 | Michael | 29/182.1 X |
| 3,495,957 | 2/1970 | Matobu et al. | 29/182.1 |
| 3,806,325 | 4/1974 | Niimi et al. | 29/182.1 |
| 3,812,565 | 5/1974 | Seino et al. | 29/182.1 |
| 3,829,295 | 8/1974 | Farmer et al. | 29/182.1 |

OTHER PUBLICATIONS

Chem. Abs. No. 79: 148696 Abstracting Japan Kokai, pp. 73–112 of 1/5/73.

Primary Examiner—Richard E. Schafer
Attorney, Agent, or Firm—Fleit & Jacobson

[57] ABSTRACT

Sliding seal member for an internal combustion engine constituted by a sintered material comprising a compacted body of eutectic alloy particles and 4.0 to 6.0 weight percent of phosphor, 1.0 to 5.0 weight percent of carbon and the balance of iron, a suitable binding metal being infiltrated in the compacted body and the amount of the binder being 10 to 30 volume percent of the sealing member.

3 Claims, 3 Drawing Figures

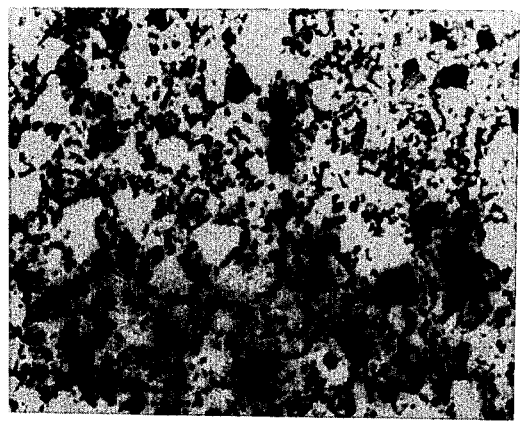
X 115
F I G. I
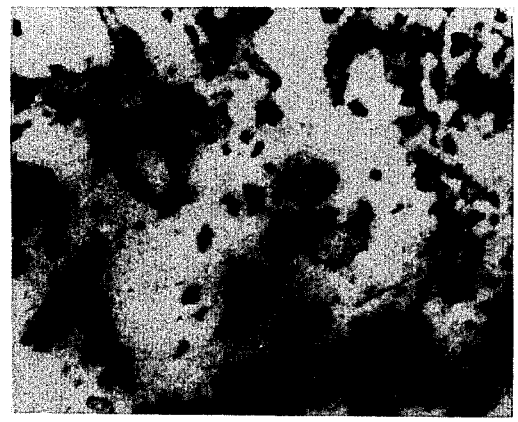
X 460
F I G.2

SLIDING SEAL MEMBER FOR AN INTERNAL COMBUSTION ENGINE

The present invention relates to a sliding seal member for an internal combustion engine and more particularly to a sliding seal member made of a sintered alloy comprising a compacted body of Fe—P—C type ternary eutectic alloy particles including a metallic alloy binder infiltrated therein.

Hithertofore, various types of metallic sliding seal members have been proposed for use in internal combustion engines. The known types of sealing members have been satisfactory in respect of strength and productivity, however, they have disadvantages in that, when they are used against metal surfaces, there have often been experienced seizings between the sliding seal members and the cooperating metal surfaces. Thus, when a sliding member is used to co-operate with a metal surface, it is preferred that the member is made of a non-metallic material.

There have already been proposed to use non-metallic sintered bodies primarily comprising TiC, WC and/or SiC particles and an appropriate binder. Such sintered bodies show excellent characteristics in respect of wear resistant property, strength, workability and anti-seize property, however, they show excessive hardness so that co-operating surfaces are often scratched.

A chromium plated surface, a nitrided cast iron surface and an induction hardened cast iron surface usually show hardness between 700 Hv to 1500 Hv. The sliding member should preferably have an equivalent or slightly less hardness as compared with the co-operating surface in order that it is not worn excessively and that it does not cause any damage on the co-operating surface. Since the aforementioned TiC, WC and SiC type sintered materials show surface hardness of 3200 Hv, 1800 Hv and 3000 Hv, respectively, they often produce scratches on the co-operating surfaces.

Fe—P—C type eutectic alloy has a non-metallic eutectic portion having a hardness of 700 Hv to 750 Hv. Thus, it will be appreciated that it is most suitable for use as a sliding member in an internal combustion engine. In general, however, there are problems in that a eutectic alloy or an inter-metal compound shows a hard and brittle property so that, when it is casted, it is very difficult to apply a machining work except a grinding operation, and that crack may be produced when the casted metal is being cooled. Further, known eutectic alloys do not have sufficient strengths for use as sliding members in an internal combustion engine.

Therefore, the present invention has an object to provide a novel sliding seal member for an internal combustion engine.

Another object of the present invention is to provide a sliding seal member which has a sufficient strength for the purpose and can be readily produced.

A further object of the present invention is to provide a method for producing such a sliding seal member.

According to the present invention, there is provided a sliding seal member for an internal combustion engine comprising a compacted body of eutectic alloy particles including 4.0 to 6.0 weight percent of phosphorus, 1.0 to 5.0 weight percent of carbon and the balance of iron, and binder infiltrated in the compacted body, the binder being 10 to 30 percent in volume of the sealing member.

The seal member may be produced, in accordance with the present invention, by compacting the particles of the eutectic alloy into a desired shape and thereafter infiltrating the binder into the compacted body. In order to provide an increased mechanical strength, a certain amount of binding metal may be mixed with the particles of the eutectic alloy before the particles are compacted.

The binding metal which can be used in the present invention must have a lower melting point than the alloy particles and must have wettability to the particles. Further, the binding metal must not be reactive to or form an alloy with the eutectic alloy particles. For example, Cu-Sn type alloy, high Mn-Zn type alloy and Ni-P type alloy may be used in the present invention. Referring to the copper-tin type alloy binder, it should preferably include 10 to 50 weight percent of tin, the balance being copper. With tin content less than 10 percent, the Cu-Sn type alloy has a melting point exceeding 1000°C so that it becomes difficult to infiltrate the alloy in the compacted body. With the tin content exceeding 50 percent, the alloy looses wettable property to the eutectic alloy particles in the compacted body and also become brittle.

Preferable composition of high manganese-zinc alloy is found to be 25 weight percent of manganese, 1.5 weight percent of copper, 1 weight percent of silver and the balance of zinc. The nickel phosphorus alloy that may be used as the binding metal in accordance with the present invention includes 8 to 12 weight percent of phosphorus. The binding metal may be used either in the form of a compacted block of particles or a casted block which may be machined into a desired shape if necessary.

According to the present invention, the wear-resistant sintered alloy is formed by initially dividing Fe—P—C type eutectic alloy including 4.0 to 6.0 weight percent of phosphorus, 1.0 to 5.0 weight percent of carbon and the balance of iron, to obtain particles thereof, then thoroughly mixing the particles with addition of lubricant, compacting the particles into a desired configuration, and thereafter infiltrating binding metal in molten condition. The infiltration may be performed by placing the casted or compacted block of the binding metal on the compacted body of the eutected alloy particles, then pre-heating them in a furnace having a suitable atmosphere to a temperature of about 600°C, and thereafter melting the binding metal which is allowed to flow into the voids in the compacted body.

According to the present invention, it is very important that the Fe—P—C type ternary alloy includes 4.0 to 6.0 weight percent of phosphorus and 1.0 to 5.0 weight percent of carbon. With the phosphorus and carbon contents less than the above values, the amount of the eutectic or non-metallic structure correspondingly decreases, so that a sliding member made thereby is often seized on a co-operating surface. Further, the hardness of the alloy is decreased as low as 500 Hv resulting in a decreased wear resistant property. With the phosphorus and carbon contents exceeding the above values, excessive numbers of blow holes are produced in casted ingots. Further, casting operation of the alloy becomes difficult since the alloy possesses a poor fluid characteristics under molten condition when the phosphorus and carbon contents are greater than the aforementioned values.

With the phosphorus and carbon contents within the aforementioned ranges, the alloy has 60 to 100 volume percent of eutectic structure. The compacted body includes 60 to 80 volume percent of solids when it is compacted. This means that the compacted body includes 40 to 20 volume percent of voids. Since the voids are not always continuous with each other, some of them cannot be completely filled with the binding metal. In an actual experience, it has been found that 80 percent of the voids are filled with the binder. Thus, the sintered body usually has about 30 volume percent of binding metal. In order to provide a sufficient strength, the sintered body should include at least 10 volume percent of binding metal. However, it has also been found that the amount of binding metal exceeding 30 volume percent is not preferable from the viewpoint of seizing problem. Therefore, the inventor recommends 10 to 30 volume percent of binding metal.

When the compacted body of the eutectic ternary alloy particles has less voids so that it is difficult to infiltrate more than 10 volume percent of binding metal through a mere infiltrating process, it is advisable to mix particles of the binding metal with the particles of the eutectic ternary alloy before the latter particles are compacted. By this method, increased amount of voids can be filled with the binding metal resulting in an increased mechanical strength.

FIGS. 1 and 2 are photomicrographs of the composition according to Example 1.

Figure 3:
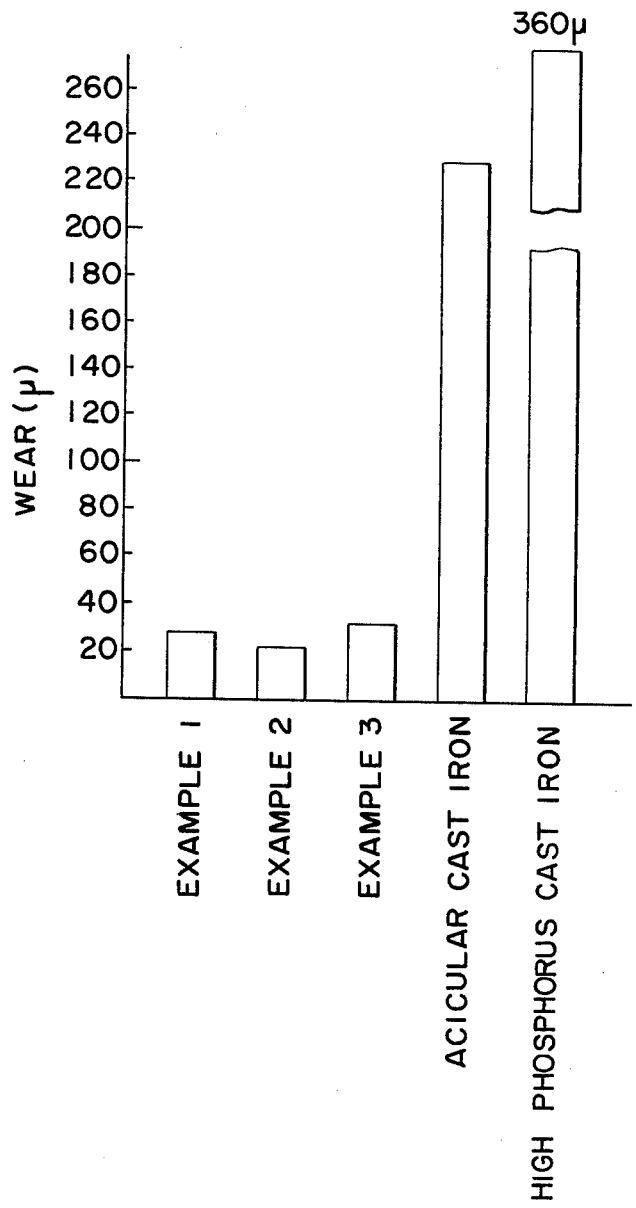
FIG. 3 shows the compartive results of wear tests.

The present invention will further be described by way of examples.

EXAMPLE 1

The following materials were prepared.

Fe—P—C type ternary eutectic alloy including 5.6 weight percent of phosphorus, 1.6 weight percent of carbon, 0.2 weight percent of impurities and the balance of iron; and binding metal including 20 weight percent of tin and 80 weight percent of copper.

The Fe—P—C type ternary eutectic alloy having the aforementioned composition was molten and finely divided to form fine particles of the alloy which are smaller than 150 mesh. The finely divided particles were then added with 1.0 weight percent of zinc stearate and agitated in a double cone type mixer for about 20 minutes. Thereafter, the mixture was compacted under a pressure of 3 ton/cm² into a piece of 12 mm wide, 7 mm thick and 65 mm long.

The binding metal of the aforementioned composition was also molten and finely divided to form fine particles of the metal. The particles were then added with 1.0 weight percent of zinc stearate and agitated in a V-type mixer for 20 minutes. Thereafter, the mixture was compacted under a pressure of 3 ton/cm² into a piece of 10 mm wide, 6 mm thick and 30 mm long.

The compacted body of the binding metal was placed on the compacted body of the ternary eutectic alloy and pre-heated under the argon atmosphere to 600°C. Thereafter, the stacked bodies were heated under a temperature of 950°C for 15 minutes whereby 23 volume percent of binding metal was infiltrated into the voids in the compacted body of the ternary eutectic alloy particles.

After cooling, the sintered body had density of 7.2 to 7.4 g/cc and hardness of RC 35 to 40. Bending test was performed using a test piece of 12.5 mm wide, 6.35 mm thick and 31.75 mm long with a span length of 25.4 mm. The durable bending stress S was calculated as being 50 to 55 kg/mm² from the equation $$S = \frac{3 \times P \times l}{2 \times t^2 \times W}$$

where:

P represented the durable bending load, $l$ the span length, $t$ the thickness of the test piece and W the width.

A sliding member for an internal combustion engine is usually required to have a durable bending stress of 30 kg/mm² at the smallest. It will be apparent that the sintered alloy satisfies the above requirement.

Microscopic structure of the sintered alloy is shown in FIGS. 1 and 2. FIG. 1 is a photograph taken with 115 powers of magnification and FIG. 2 is a photograph taken with 460 powers of magnification. In the photographs, the voids are shown by the black, the binding metal by the gray areas and the ternary eutectic alloy by the other areas.

EXAMPLES 2 AND 3

Wear resistant sintered alloys were formed as in the Example 1 using the Fe—P—C type ternary eutectic alloy having the same composition as used in the Example 1 and the binding metals which were different in composition from that used in the Example 1. The compositions of the sintered alloys as prepared in the Examples 2 and 3 are shown in the Table. For the purpose of reference, composition of acicular cast iron and that of high phosphorus cast iron are also shown in the Table.

Wear tests were performed on the sintered alloys as prepared in the Examples 1, 2 and 3 as well as the acicular cast iron and the high phosphorus cast iron. In each wear test, the specimen was urged onto a disc plate under force of 1.8 kg without lubricant and rotated the disc plate at a speed of 19.8 m/sec. for 10 minutes. The amount of wear is shown in FIG. 3.

Table

| | Basic Alloy | Binding Metal |
|---|---|---|
| Example 2 | P 5.6%, C 1.6% Impurities 0.2% Fe balance | Sn 10% Cu 90% |
| Example 3 | P 5.6%, C 1.6% Impurities 0.2% Fe balance | Sn 50% Cu 50% |
| Acicular Cast Iron | Si 2.2%, Mn 0.7%, Ni 2.0%, Mo 0.3%, Cu 1.0%, C 3.0%, Fe balance | |
| High Phosphor Cast Iron | Si 2.0%, Mn 0.8%, P 0.6%, C 3.0%, Fe balance | |

In FIG. 3, it will be seen that the sintered alloys prepared in accordance with the present invention show excellent wear-resistant property as compared with known materials which have been used as sliding seal members for an internal combustion engine. The seal member in accordance with the present invention has a hard basic structure constituted by Fe—P—C type ternary eutectic alloy particles and relatively mild binding metal structure dispersed among the eutectic alloy particles. The basic structure provides an excellent wear resistant property and the binding metal provides a better tenacity. Further, the seal member is produced by a sintering process, it can be used without substantial machining.

The invention has thus been described with reference to specific examples, however, it should be noted that the invention is in no way limited to the materials and compositions as described but the scope of the invention shall be limited only by the appended claims.

I claim:

1. A sliding seal member for an internal combustion engine, comprising a compacted body of eutectic alloy particles composed of from about 4.0 to about 6.0 weight percent of phosphorus, from about 1.0 to about 5.0 weight percent of carbon and the balance of iron, and a binder infiltrated in the compacted body, the binder being from about 10 to about 30 volume percent of the sealing member, and including from about 10 to about 50 weight percent of tin and the balance of copper.

2. A sliding seal member for an internal combustion engine, comprising a compacted body of eutectic alloy particles composed of from about 4.0 to about 6.0 weight percent of phosphorus, from about 1.0 to about 5.0 weight percent of carbon and the balance of iron, and a binder infiltrated in the compacted body, the binder being from about 10 to about 30 volume percent of the sealing member, and including about 25 weight percent of manganese, about 1.5 weight percent of copper, about 1 weight percent of silver and the balance of zinc.

3. A sliding seal member for an internal combustion engine, comprising a compacted body of eutectic alloy particles composed of from about 4.0 to about 6.0 weight percent of phosphorus, from about 1.0 to about 5.0 weight percent of carbon and the balance of iron, and a binder infiltrated in the compacted body, the binder being from about 10 to about 30 volume percent of the sealing member, and including from about 8 to about 12 weight percent of phosphorus and the balance of nickel.

* * * * *